US007393807B2

(12) United States Patent
Yoshimura et al.

(10) Patent No.: US 7,393,807 B2
(45) Date of Patent: Jul. 1, 2008

(54) HYDROTREATING CATALYST OF CATALYTIC CRACKING GASOLINE

(75) Inventors: Yuji Yoshimura, Ibaraki (JP); Makoto Toba, Ibaraki (JP); Nobuyuki Matsubayashi, Ibaraki (JP); Takashi Matsui, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 119 days.

(21) Appl. No.: 11/131,239

(22) Filed: May 18, 2005

(65) Prior Publication Data

US 2005/0261124 A1 Nov. 24, 2005

(30) Foreign Application Priority Data

May 19, 2004 (JP) ......................... P. 2004-149687

(51) Int. Cl.
*B01J 27/19* (2006.01)
*B01J 27/185* (2006.01)
*B01J 27/043* (2006.01)
*B01J 27/049* (2006.01)

(52) U.S. Cl. ........................ 502/211; 502/213; 502/221; 502/222; 502/506; 502/512

(58) Field of Classification Search ................. 502/211, 502/213, 220, 221, 506, 512
See application file for complete search history.

(56) References Cited

U.S. PATENT DOCUMENTS 4,016,106 A * 4/1977 Sawyer et al. ............... 502/254
4,149,965 A 4/1979 Pine et al.
4,485,183 A * 11/1984 Miller et al. .................. 502/25
4,990,242 A 2/1991 Louie et al.
5,162,281 A * 11/1992 Kamo et al. ................ 502/168
5,318,690 A 6/1994 Fletcher et al.
5,352,354 A 10/1994 Fletcher et al.

FOREIGN PATENT DOCUMENTS

| | | | |
|---|---|---|---|
| EP | 0 725 126 | | 8/1996 |
| EP | 0 736 589 | | 10/1996 |
| JP | A-8-209154 | | 8/1996 |
| JP | A-8-277395 | | 10/1996 |
| JP | A-9-137172 | | 5/1997 |
| JP | 2000-079343 | * | 3/2000 |
| JP | 2000-342976 | * | 12/2000 |
| JP | 2003-230837 | * | 8/2003 |
| JP | A-2003-286493 | | 10/2003 |
| JP | A-2003-299959 | | 10/2003 |
| JP | 2005-262063 | * | 9/2005 |
| JP | 2005-329320 | * | 12/2005 |
| WO | 95/10850 | | 4/1995 |
| WO | 96/07713 | | 3/1996 |
| WO | 97/08272 | | 3/1997 |
| WO | 00/29510 | | 5/2000 |

* cited by examiner

*Primary Examiner*—J. A. Lorengo
*Assistant Examiner*—Patricia L Hailey
(74) *Attorney, Agent, or Firm*—Morgan, Lewis & Bockius LLP

(57) ABSTRACT

A hydrotreating catalyst comprising a Group 8 metal of the periodic table, molybdenum (Mo), phosphorus and sulfur, wherein the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when $MoS_2$ structure in the catalyst is measured in accordance with extended X-ray absorption fine structure (EXAFS) analysis.

10 Claims, 1 Drawing Sheet

*: SULFURATION AT LOW TEMPERATURE

*: SULFURATION AT LOW TEMPERATURE

HYDROTREATING CATALYST OF CATALYTIC CRACKING GASOLINE

BACKGROUND OF THE INVENTION

1. Field of the Invention

The present invention relates to a hydrotreating catalyst containing molybdenum (Mo). Particularly, it relates to a hydrotreating catalyst having high desulfurization activity and desulfurization selectivity when used in hydrotreatment in which a sulfur content in catalytic cracking gasoline is reduced and also hydrogenation of olefins and aromatics is suppressed.

2. Brief Description of the Background Art

Form the viewpoint of environmental protection of city and roadside air and reduction of environmental burden on a global scale, it has been required to clean exhaust gas from automobiles and reduce the discharge of carbon dioxide. With regard to gasoline-powered automobiles, in order to reduce the discharge of carbon dioxide, it is required to improve fuel economy. Thus, thereafter, it is expected that high mileage automobiles having a direct-injection engine or a lean burn engine may increase. For these automobiles, a nitrogen oxide-reducing catalyst working under oxygen-excessive conditions (lean conditions) is necessary, which is different from a ternary catalyst which is a conventional nitrogen oxide-reducing catalyst. However, since the nitrogen oxide-reducing catalyst working under oxygen-excessive conditions (lean conditions) is poisoned by sulfur content and cleaning performance lowers, it is still required to achieve further decrease of the sulfur content in gasoline.

Currently, commercially available gasoline is prepared by mixing various base materials so as to satisfy the standard of an octane number. Among the materials, a catalytic cracking gasoline obtained by cracking, in a catalytically cracking apparatus, vacuum gas oil and atmospheric residue whose uses are limited as they are is a base material having a high octane number and a mixing ratio thereof in the commercially available gasoline is as high as 40 to 70%. However, since starting materials of the catalytic cracking gasoline are vacuum gas oil and atmospheric residue containing a large amount of sulfur, the sulfur content of the resulting catalytic cracking gasoline is also higher than other base materials for gasoline. Therefore, in order to reduce the sulfur content of the commercially available gasoline produced by mixing various base materials, it is indispensable to desulfurize the catalytic cracking gasoline which is a main base material.

For reducing the sulfur content of the catalytic cracking gasoline, it is common to use the vacuum gas oil and atmospheric residue after hydrodesulfurization as starting oils for catalytic cracking. However, the apparatus for hydrodesulfurization of these heavy oils is an apparatus requiring a high temperature and a high pressure and hence there exist many technical and economical problems in ultra-deep desulfurization of the staring oils.

Sulfur compounds contained in the catalytic cracking gasoline can be hydrodesulfurized by an apparatus requiring relatively low temperature and low pressure. Therefore, if the catalytic cracking gasoline can be directly hydrodesulfurized, there are advantages that the process may be not only economically inexpensive but also can respond the case where the sulfur content of the starting oils for catalytic cracking is high. However, when the catalytic cracking gasoline is hydrodesulfurized with a conventional desulfurization catalyst, there arises a problem that olefins contained in the catalytic cracking gasoline as components having a high octane number are also hydrogenated to result in decrease of the octane number.

In order to improve the problem, with regard to the hydrotreatment of the catalytic cracking gasoline, there are a technique of separating the starting oil into a light component and a heavy component by distillation and hydrodesulfurizing each component under different conditions (JP-A-8-209154, U.S. Pat. Nos. 4,990,242, and 5,318,690); a process for reducing the sulfur content by reacting diolefins and mercaptans contained in the catalytic cracking gasoline in minute amounts to convert them into sulfides and removing the sulfides by distillation (WO97/08272 (corresponding to JP-T-2001-519834)); a process for hydrodesulfurization after converting terminal olefins into inner olefins having a low reactivity (JP-A-9-137172); a process comprising hydrodesulfurization involving the decrease of the octane number by hydrogenation of olefins in the first step and subsequently recovering the octane number by isomerization with a solid acid catalyst in the second step (WO95/10850 (corresponding to JP-T-9-503814) and WO96/07713 (corresponding to JP-T-10-505381)); and the like. However, there are problems that the suppression of hydrogenation of the olefins is not sufficient, the decrease of the sulfur content is limited since kinds of sulfur compounds capable of being reduced are restricted, and other facilities are necessary since a multi-step and complex process is required. Therefore, it is desired to develop a hydrotreating catalyst low in hydrogenation activity against olefins in the catalytic cracking gasoline and excellent in desulfurization.

With regard to a selective desulfurization catalyst for the catalytic cracking gasoline for solving such problems, there have been proposed a method of using a catalyst modified with an alkali metal (JP-A-8-277395); a method of preventing the decrease of the octane number by the combination with a zeolite catalyst (U.S. Pat. No. 5,352,354 and WO00/29510 (corresponding to JP-T-2002-530469)); a method of using a catalyst subjected to a certain pretreatment (U.S. Pat. No. 4,149,965); a method of using a hydrodesulfurization catalyst prepared using an organic carboxylic acid (JP-A-2003-286493); a method of using a catalyst obtained by laminating a certain amount or more of an active metal as a catalyst (JP-A-2003-299959), and the like. However, since hydrogenation depth of olefins is also enhanced simultaneously when the desulfurization activity against the catalytic cracking gasoline is tried to be enhanced, there arises a problem that the decrease of the octane number cannot be sufficiently suppressed.

With regard to the hydrotreating catalyst for the catalytic cracking gasoline for solving such problems, there have been conventionally widely used sulfide catalysts obtained by preparing an impregnating solution comprising a compound of molybdenum, a compound of a Group 8 metal of the periodic table, such as cobalt or nickel, and/or a phosphorus compound and supporting the solution in an oxide form on a porous inorganic oxide support such as alumina, silica, or zeolite, followed by activation through presulfuration. The active sites for desulfurization in these sulfide catalysts are considered to be sulfur-coordinating unsaturated sites exhibited on a Group 8 metal-Group 6 metal-S structure (e.g., Co—Mo—S structure) formed at the edge site of a sulfide layer of molybdenum or tungsten which is a Group 6 metal. In order to improve the desulfurization activity, an attempt to highly disperse the Group 6 metal sulfide has been carried out.

However, since there are no attempt to quantitatively determine the degree of high dispersion of the group 6 metal sulfide and to correlate the degree with desulfurization properties of the catalytic cracking gasoline and reaction properties of olefins, there exists no sufficient guidelines for designing a catalyst for hydrotreatment of the catalytic cracking gasoline and hence it is difficult to respond requests for further improvement of the desulfurization performance and suppressing hydrogenation of olefins.

SUMMARY OF THE INVENTION

An object of the present invention is to provide a hydrodesulfurization catalyst for catalytic cracking gasoline having a high degree of $MoS_2$ dispersion in the Group 8 metal of the periodic table-molybdenum-phosphorus-sulfur structure and possessing excellent desulfurization activity and hydrogenation-suppressing function against olefins and aromatics contained.

The present inventors have found that a hydrodesulfurization catalyst (dried catalyst) for catalytic cracking gasoline obtainable by impregnating a support (carrier) with an impregnating solution for a hydrotreating catalyst for catalytic cracking gasoline, which contains a molybdenum compound, at least one metal compound of Group 8 metal(s) of the periodic table, a phosphorus compound, and a saccharide derivative, drying the impregnated support, and subsequently activating the resulting catalyst by sulfuration with hydrogen sulfide (presulfuration) exhibits a high degree of crystallinity with a high degree of sulfuration and has both of a high desulfurization activity and a suppressive effect on olefin hydrogenation as compared with a hydrodesulfurization catalyst (burned catalyst) for catalytic cracking gasoline obtainable by impregnating a support with an impregnating solution having the same composition, drying the impregnated support, further heating and burning it, and subsequently subjecting it to the presulfuration. As a result of further analysis on the catalyst structure, they have found that the average coordination number of the molybdenum atoms around the molybdenum atom and the average coordination number of the sulfur atoms around the molybdenum atom remarkably influence the desulfurization activity and the olefin hydrogenation activity, and thus have accomplished the present invention.

Namely, this and other objects of the present invention have been accomplished by a hydrotreating catalyst comprising a Group 8 metal of the periodic table, molybdenum (Mo), phosphorus and sulfur, wherein the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when $MoS_2$ structure in the catalyst is measured in accordance with extended X-ray absorption fine structure (EXAFS) analysis.

Also, this and other objects of the present invention have been accomplished by a process for producing the hydrotreating catalyst, which comprises impregnating a support with an impregnating solution comprising a molybdenum compound, at least one metal compound of Group 8 metal(s) of the periodic table, a phosphorus compound, and a saccharide derivative, followed by drying under irradiation with a microwave.

DETAILED DESCRIPTION OF THE INVENTION

Figure 1:
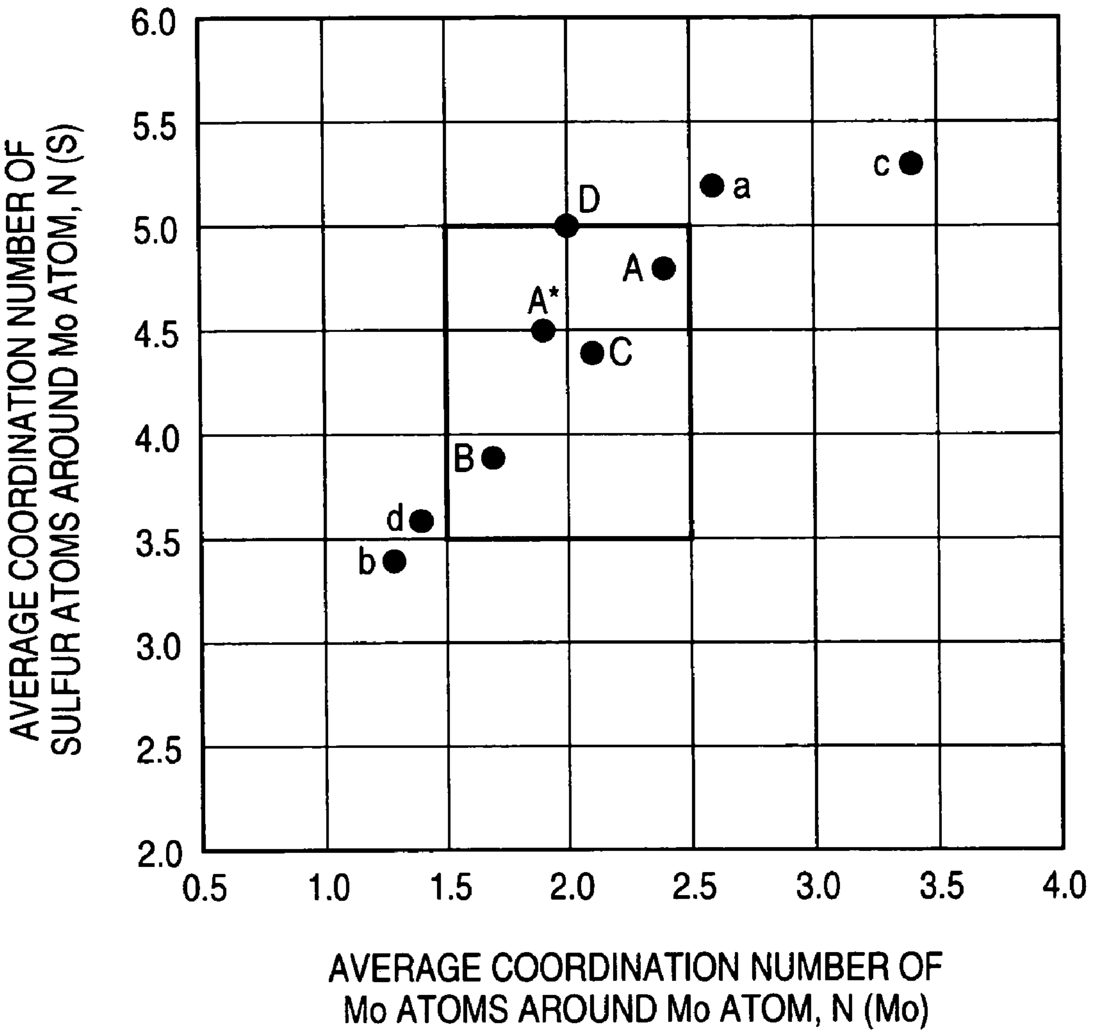
FIG. 1 shows the relationship between the average coordination number [N(Mo)] of the molybdenum atoms around the molybdenum atom and the average coordination number [N(S)] of the sulfur atoms around the molybdenum atom obtained in the measurement of the structures of $MoS_2$ in the sulfide catalysts, which are obtained after standard sulfuration (360° C.) or sulfuration at a low temperature (320° C.), by extended X-ray absorption fine structure (EXAFS) analysis on Catalysts A to D obtained in Examples 1 to 4 and Catalysts a to d obtained in Comparative Examples 1 to 4.

When the average coordination number [N(Mo)] of the molybdenum atoms around the molybdenum atom is less than 1.5, the degree of $MoS_2$ dispersion is high whereas the degree of crystallinity is low, and the quality of the desulfurization active sites is degraded through the interaction with the support, so that a low desulfurization activity and a low olefin hydrogenation activity are observed. When the average coordination number [N(Mo)] of the molybdenum atoms around the molybdenum atom is more than 2.5, the degree of $MoS_2$ dispersion is low whereas the degree of crystallinity is high, and a high desulfurization activity and a high olefin hydrogenation activity are observed. When the average coordination number [N(S)] of the sulfur atoms around the molybdenum atom is less than 3.5, the desulfurization active sites are not sufficiently formed and thus the desulfurization activity becomes low. When the average coordination number [N(S)] of the sulfur atoms around the molybdenum atom is more than 5, the hydrogen from the SH group formed on the sulfur participates in the reaction, so that the olefin hydrogenation activity becomes high.

As the form of the compound of molybdenum to be introduced in the supporting solution, in addition to a metal oxide such as molybdenum oxide, a metal salt such as a halide, a sulfate or an organic acid salt can be employed but, in consideration of the residual unnecessary components in the catalyst and an exhaust gas at the following burning step, it is preferred to use a metal oxide or an organic acid salt.

The total content of molybdenum is preferably from 5 to 20% by weight, particularly from 6 to 15% by weight, in terms of oxide, based on the weight of the catalyst. When the content is less than 5% by weight, lamination of molybdenum sulfide layers hardly occurs and a sufficient desulfurization activity is not obtained due to a strong interaction between molybdenum sulfide and the support. Moreover, when the content exceeds 20% by weight, since lamination of the molybdenum sulfide layers occurs on the support surface and an exposed amount of the active edge part of the sulfide layers increases, a sufficient desulfurization activity is obtained but hydrogenation of olefins simultaneously proceeds, so that selective desulfurization cannot be achieved.

As the Group 8 metal of the periodic table, iron, cobalt, nickel and the like may be employed singly or in combination. As the form of the compound to be introduced into the supporting solution, a metal salt such as a nitrate, a halide, a sulfate, a carbonate, a hydroxide, or an organic acid salt can be used but, in consideration of the residual unnecessary components in the catalyst and an exhaust gas at the following burning step, it is particularly preferred to use a metal oxide, a hydroxide, or an organic acid salt.

The total content of the Group 8 metal of the periodic table is preferably from 0.5 to 8% by weight, particularly from 1 to 6% by weight, in terms of oxide, based on the weight of the catalyst, and the content based on molybdenum is preferably from 25 to 75% by mol as a metal molar ratio.

As the phosphorus compound, use can be made of ammonium dihydrogen phosphate (number of binding hand=1), diammonium hydrogen phosphate (number of binding hand=2), trimetaphosphoric acid (number of binding hand=3), pyrophosphoric acid (number of binding hand=4), or tripolyphosphoric acid (number of binding hand=5), but the use of ammonium dihydrogen phosphate is particularly preferred in view of the stable complex formation with an organic acid to be mentioned below. The amount of the phosphorus is preferably from 0.5 to 10% by weight, particularly from 1 to 5% by weight, in terms of metal, based on the catalyst, and the content based on molybdenum is preferably from 20 to 200% by mol.

In the present invention, in order to homogeneously dissolve these metal components stably, use is made of a saccharide derivative, which is a multidentate ligand, capable of easily coordinating to the metal components to form a stable composite complex.

The saccharide derivative herein refers to a compound wherein a saccharide is functionalized, e.g., oxidized, reduced, or esterified, and means a compound containing three or more alcohol groups (alcoholic hydroxyl groups) and one or more carboxyl groups which act as ligands in the compound.

Examples of the saccharide derivative include those having a structure containing both of polyhydric alcohol and a carboxyl group, e.g., aldonic acids (one carboxyl group and five alcohol groups) such as gluconic acid and mannonic acid; saccharic acids (sugar acids; two carboxyl groups and four alcohol groups) such as saccharic acid, mannosaccharic acid, and mucic acid; uronic acids (one carboxyl group and four alcohol groups) such as glucuronic acid and galactouronic acid; and the like.

The saccharide derivatives may be used singly or in combination. By using such a specific multidentate ligand, a supporting solution which is stable and has a high homogeneity can be obtained.

The concentration of the saccharide derivative in the supporting solution for use in the present invention cannot be categorically defined since it may vary depending on kind of the metal compound used and the amount thereof, but the amount of the saccharide derivative is preferably from 30 to 200% by mol, particularly from 50 to 150% by mol, based on the amount of the Group 8 metal of the periodic table.

The hydrotreating catalyst of the present invention is prepared by supporting the above-described impregnating solution for hydrotreating catalyst of the present invention on a porous inorganic oxide support. The size, shape, surface area, and pore distribution of the support and the supporting amount of the active metal component are all the same as those of the usual hydrotreating catalysts.

As the porous inorganic oxide support, any supports used for the usual hydrotreating catalysts can be employed. Examples thereof include alumina, silica, titania, zirconia, alumina-silica, alumina-titania, alumina-boria, alumina-phosphorus, silica-titania, alumina-silica-titania, alumina-silica-boria, alumina-phosphorus-boria, alumina-titania-boria, alumina-silica-phosphorus, alumina-titania-phosphorus-boria, Y-type zeolite, X-type zeolite, L-type zeolite, β-type zeolite, chabazite, erionite, mordenite, ZSM zeolite, MFI zeolite, and the like. In particular, alumina-containing supports, such as alumina, alumina-silica, alumina-titania, alumina-boria, alumina-silica-boria and alumina-phosphorus-boria, are preferred owing to large specific surface area and pore volume of the supports.

Moreover, as the supporting method of the impregnating solution on the porous inorganic oxide support, a process for producing the usual hydrotreating catalysts can be adopted. For example, there may be mentioned a method of supporting the impregnating solution on the above porous inorganic oxide support by a known impregnation method, and a method of kneading a precursor substance of the porous inorganic oxide support with the impregnating solution and subsequently molding, drying and burning the kneaded mixture.

The specific surface area, pore volume, and average pore radius of the support is not particularly limited, but the specific surface area is preferably from 10 to 600 $m^2/g$, particularly preferably from 50 to 500 $m^2/g$. The support having a specific surface area of less than 10 $m^2/g$ exhibits a poor dispersibility for the other metal components and a suitable desulfurization performance cannot be achieved. Moreover, the support having a specific surface area of more than 600 $m^2/g$ invites decrease of pore size and exhibits a poor dispersibility for the reactants and hence it is not preferred. The pore volume is preferably 0.2 cc/g or more, particularly preferably from 0.3 to 1.0 cc/g. The pore radius can be suitably selected depending on the kind of oil to be treated. For example, at the hydrotreatment of a gasoline fraction, the support having an average pore diameter of 50 to 110 Å is preferred.

The hydrodesulfurization catalyst according to the present invention can be produced by impregnating the above support with the above supporting solution to introduce predetermined metal components, subsequently drying the product, and further subjecting it to presulfuration. In this case, in the operation for impregnating the support with the supporting solution, the mode and conditions of the operation are not particularly limited, so long as the operation is a method for bringing the supporting solution into contact with the support. For example, use can be made of any known method for impregnation, such as impregnation, wet adsorption, wet kneading, spraying, coating, dipping, or the like or a combination thereof.

The drying method is also not particularly limited, but it is preferred that the product obtained by impregnating the above support with the supporting solution (hereinafter sometimes referred to as an impregnated product) is dried by evaporating the water content through irradiation with a microwave. The microwave has usually a frequency ranging from 1 GHz to 1000 GHz, preferably from 1 GHz to 10 GHz. In particular, the microwave having a frequency of 2.45 GHz is particularly suitable since it is the same as the microwave of the microwave oven used at home and water molecules are heated by resonance.

Moreover, in the irradiation with the microwave, it is desirable to control the intensity of the microwave and the irradiation time so that the water content of the impregnated product is reduced by 20% by weight or more, preferably 40% by weight or more, and more preferably 50 to 100% by weight, of the water content before irradiation. Since the above-described impregnated product is dried by applying heat in the conventional drying method, the surface of the impregnated product is first heated and hence the temperature of the surface is initially higher than that of the inside. Therefore, the migration of water from the inside to the outer surface of the impregnated product occurs and a hydrogenation active component migrates to the outer surface along with the migration of water, so that the dispersed state of the hydrogenation active component becomes inhomogeneous and hence a sufficient catalytic performance is not necessarily exhibited in many cases. On the other hand, when the above-described impregnated product is irradiated with the microwave, water molecule contained in the impregnated product rotates at a high speed by the microwave and friction heat is generated to elevate the temperature of the whole impregnated product, so that no temperature difference between the inside and the surface part occurs. Therefore, the migration of water from the inside to the outer surface of the impregnated product occurs only a little and thus the hydrogenation active component is supported at a homogeneously dispersed state.

Furthermore, in the present invention, the hydrotreating catalyst can be also obtained by a usual drying method, e.g., burning the product at a temperature of 200 to 600° C. for 0.1 to 10 hours after the above drying.

The impregnating solution for the hydrotreating catalyst of the present invention is an aqueous solution containing molybdenum (Mo) which is an active metal component of the hydrotreating catalyst. In general, a Group 6A metal or a Group 8 metal of the periodic table is used as the active metal component of the hydrotreating catalyst but a hydrotreating catalyst using a molybdenum compound exhibits particularly a high desulfurization activity and hence the catalyst is widely used. The impregnating solution for the hydrotreating catalyst may contain an active metal component usually used for the hydrotreating catalyst, such as a tungsten, cobalt, nickel or phosphorus compound, in addition to the molybdenum compound. Moreover, each metal component can be contained in an amount which is a usual composition range of the active metal component in the hydrotreating catalyst. The impregnating solution for the hydrotreating catalyst of the present invention preferably contains molybdenum (Mo) and cobalt (Co), in particular.

The above-described impregnating solution for hydrotreating catalyst is prepared by dissolving a molybdenum compound to be used for preparing a usual impregnating solution for hydrotreating catalysts, such as molybdenum trioxide or ammonium paramolybdate, using gluconic acid as a complexing agent (chelating agent). When cobalt or nickel is used in combination with molybdenum as metal components, a cobalt compound, such as basic cobalt carbonate, cobalt nitrate or cobalt sulfate, or a nickel compound, such as basic nickel carbonate, nickel nitrate or nickel sulfate, can be employed in addition to the above molybdenum compound. As a further preferable specific example, there may be mentioned a method for preparing the solution by adding predetermined amounts of molybdenum trioxide and basic nickel carbonate to water, stirring the mixture with moisturization, subsequently adding an aqueous gluconic acid solution, and further stirring the resulting mixture with moisturization. The method for preparing the impregnating solution is not limited to the above method.

At the use of the hydrogenation catalyst of the present invention, usual hydrogenation conditions are adopted. The target oil to be hydrogenated is not particularly limited, and most suitable are gasoline fractions having a boiling point range of 30 to 260° C. and a sulfur concentration of 0.2% by weight or less, such as catalytic cracking gasoline and straight-run naphtha. In particular, the hydrodesulfurization catalyst obtainable by the present invention is preferably used as a catalyst for selective hydrodesulfurization of gasoline fractions, specifically hydrodesulfurization of catalytic cracking gasoline containing an olefin content of 10 to 50%.

As is apparent form the comparison between Examples and Comparative Examples, the catalysts of the present invention wherein the coordination number of Mo [N(Mo)] is from 1.5 to 2.5 and the coordination number of S [N(S)] is from 3.5 to 5.0, are catalysts wherein active components are supported on a support in a highly dispersed state and the catalysts can provide edge sites of $MoS_2$ suitable for the formation of a Group 8 metal of the periodic table-molybdenum-phosphorus-sulfur structure as compared with the following catalysts which do not satisfy the requirements, i.e., those wherein the coordination number of Mo [N(Mo)] is less than 1.5, the coordination number of Mo [N(Mo)] is more than 2.5, the coordination number of S [N(S)] is less than 3.5, or the coordination number of S [N(S)] is more than 5.0.

Therefore, the catalysts of the present invention possess an excellent desulfurization activity and an excellent function of suppressing hydrogenation of olefins and aromatics contained and hence are extremely suitable as selective hydrodesulfurization catalyst for oils at a hyperdesulfurized level, such as catalytic cracking gasoline.

The present invention is described below with reference to Examples and Comparative Examples but the present invention is not limited thereto.

EXAMPLE 1

Preparation of Catalyst:

(1) Preparation of Support

At the preparation of a catalyst, γ-alumina (shape: 1/16 inch cylinder) which was a porous inorganic oxide was used as a support. The surface area of the support was 195 $m^2/g$ and the pore volume thereof was 0.80 $cm^3/g$.

(2) Preparation of Impregnating Solution

To a 2,000 ml beaker were added 1,500 ml of water and 64.0 g of molybdenum trioxide, followed by stirring at 95° C. for 10 hours. Then, 28.0 g of basic cobalt carbonate was added thereto, followed by stirring at 95° C. for 5 hours. The mixture was cooled to 75° C. and 130.0 g of a 50% gluconic acid solution (gluconic acid/cobalt=1.5/1 (mol/mol)) was added thereto, followed by stirring at the same temperature for 5 hours. The resulting solution was concentrated to 320 ml and subsequently 10.0 g of ammonium dihydrogen phosphate was added and dissolved to prepare an aqueous Co—Mo—P-gluconic acid solution.

(3) Preparation of Catalyst

The aqueous Co—Mo—P-gluconic acid solution prepared in (2) was supported on the γ-alumina of (1) by an impregnation method. That is, 50 g of the γ-alumina was impregnated with 40 ml of the above aqueous impregnating solution. Then, the impregnated product was irradiated with a microwave having a frequency of 2.45 GHz for 10 minutes to be dried, whereby Catalyst A was prepared.

EXAMPLE 2

Preparation of Catalyst:

(1) Preparation of Support

The same alumina support as used in Example 1 was employed.

(2) Preparation of Impregnating Solution

To a 2,000 ml beaker were added 1,500 ml of water and 64.0 g of molybdenum trioxide, followed by stirring at 95° C. for 10 hours. Then, 28.0 g of basic cobalt carbonate was added thereto, followed by stirring at 95° C. for 5 hours. The mixture was cooled to 75° C. and 130.0 g of a 50% gluconic acid solution (gluconic acid/cobalt=1.5/1 (mol/mol)) was added thereto, followed by stirring at the same temperature for 5 hours. The resulting solution was concentrated to 424 ml and subsequently 10.0 g of ammonium dihydrogen phosphate was added and dissolved to prepare an aqueous Co—Mo—P-gluconic acid solution.

(3) Preparation of Catalyst

The aqueous Co—Mo—P-gluconic acid solution prepared in (2) was supported on the γ-alumina of (1) by an impregnation method. That is, 50 g of the γ-alumina was impregnated with 40 ml of the above aqueous impregnating solution. Then, the impregnated product was irradiated with a microwave having a frequency of 2.45 GHz for 10 minutes to be dried, whereby Catalyst B was prepared.

EXAMPLE 3

Preparation of Catalyst:

(1) Preparation of Support

A catalyst was prepared by the same operations as in Example 1 except that the catalyst was burned. That is, to a 2,000 ml beaker were added 1,500 ml of water and 64.0 g of molybdenum trioxide, followed by stirring at 95° C. for 10 hours. Then, 28.0 g of basic cobalt carbonate was added thereto, followed by stirring at 95° C. for 5 hours. The mixture was cooled to 75° C. and 130.0 g of a 50% gluconic acid solution (gluconic acid/cobalt=1.5/1 (mol/mol)) was added thereto, followed by stirring at the same temperature for 5 hours. The resulting solution was concentrated to 320 ml and subsequently 10.0 g of ammonium dihydrogen phosphate was added and dissolved to prepare an aqueous Co—Mo—P-gluconic acid solution. With the aqueous Co—Mo—P-gluconic acid solution was impregnated 50 g of the γ-alumina. Then, the impregnated product was irradiated with a microwave having a frequency of 2.45 GHz for 10 minutes to be dried and subsequently burned in an electric furnace at 550° C. for 1 hour, whereby Catalyst C was prepared.

EXAMPLE 4

Preparation of Catalyst:

(1) Preparation of Support

At the preparation of a catalyst, γ-alumina (shape: 1/16 inch cylinder) which was a porous inorganic oxide was used as a support. The surface area of the support was 160 $m^2/g$ and the pore volume thereof was 0.72 $cm^3/g$.

(2) Preparation of Impregnating Solution

To a 2,000 ml beaker were added 1,500 ml of water and 64.0 g of molybdenum trioxide, followed by stirring at 95° C. for 10 hours. Then, 28.0 g of basic cobalt carbonate was added thereto, followed by stirring at 95° C. for 5 hours. The mixture was cooled to 75° C. and 130.0 g of a 50% gluconic acid solution [gluconic acid/cobalt=1.5/1 (mol/mol)] was added thereto, followed by stirring at the same temperature for 5 hours. The resulting solution was concentrated to 220 ml and subsequently 10.0 g of ammonium dihydrogen phosphate was added and dissolved to prepare an aqueous Co—Mo—P-gluconic acid solution.

(3) Preparation of Catalyst

The aqueous Co—Mo—P-gluconic acid solution prepared in (2) was supported on the γ-alumina of (1) by an impregnation method. That is, 50 g of the γ-alumina was impregnated with 36 ml of the above aqueous impregnating solution. Then, the impregnated product was irradiated with a microwave having a frequency of 2.45 GHz for 10 minutes to be dried, whereby Catalyst D was prepared.

COMPARATIVE EXAMPLE 1

Preparation of Catalyst:

(1) Preparation of Support

The same alumina support as used in Example 1 was employed.

(2) Preparation of Impregnating Solution

To a 2,000 ml beaker were added 1,500 ml of water and 64.0 g of molybdenum trioxide, followed by stirring at 95° C. for 10 hours. Then, 28.0 g of basic cobalt carbonate was added thereto, followed by stirring at 95° C. for 5 hours. The mixture was cooled to 75° C. and 130.0 g of a 50% gluconic acid solution (gluconic acid/cobalt=1.5/1 (mol/mol)) was added thereto, followed by stirring at the same temperature for 5 hours. The resulting solution was concentrated to 160 ml and subsequently 10.0 g of ammonium dihydrogen phosphate was added and dissolved to prepare an aqueous Co—Mo—P-gluconic acid solution.

(3) Preparation of Catalyst

The aqueous Co—Mo—P-gluconic acid solution prepared in (2) was supported on the γ-alumina of (1) by an impregnation method. That is, 50 g of the γ-alumina was impregnated with 40 ml of the above aqueous impregnating solution. Then, the impregnated product was irradiated with a microwave having a frequency of 2.45 GHz for 10 minutes to be dried, whereby Catalyst a was prepared.

COMPARATIVE EXAMPLE 2

Preparation of Catalyst:

(1) Preparation of Support

The same alumina support as used in Example 1 was employed.

(2) Preparation of Impregnating Solution

To a 2,000 ml beaker were added 1500 ml of water and 64.0 g of molybdenum trioxide, followed by stirring at 95° C. for 10 hours. Then, 28.0 g of basic cobalt carbonate was added thereto, followed by stirring at 95° C. for 5 hours. The mixture was cooled to 75° C. and 130.0 g of a 50% gluconic acid solution (gluconic acid/cobalt=1.5/1 (mol/mol)) was added thereto, followed by stirring at the same temperature for 5 hours. The resulting solution was concentrated to 640 ml and subsequently 10.0 g of ammonium dihydrogen phosphate was added and dissolved to prepare an aqueous Co—Mo—P-gluconic acid solution.

(3) Preparation of Catalyst

The aqueous Co—Mo—P-gluconic acid solution prepared in (2) was supported on the γ-alumina of (1) by an impregnation method. That is, 50 g of the γ-alumina was impregnated with 40 ml of the above aqueous impregnating solution. Then, the impregnated product was irradiated with a microwave having a frequency of 2.45 GHz for 10 minutes to be dried, whereby Catalyst b was prepared.

COMPARATIVE EXAMPLE 3

Preparation of Catalyst:

(1) Preparation of Support

The same alumina support as used in Example 1 was employed.

(2) Preparation of Impregnating Solution

To a 2,000 ml beaker were added 1,500 ml of water and 64.0 g of molybdenum trioxide, followed by stirring at 95° C. for 10 hours. Then, 28.0 g of basic nickel carbonate was added thereto, followed by stirring at 95° C. for 5 hours. The mixture was cooled to 75° C. and 100.0 g of a 50% gluconic acid solution (gluconic acid/nickel=1.2/1 (mol/mol)) was added thereto, followed by stirring at the same temperature for 5 hours. The resulting solution was concentrated to 160 ml and subsequently 10.0 g of ammonium dihydrogen phosphate was added and dissolved to prepare an aqueous Ni—Mo—P-gluconic acid solution.

(3) Preparation of Catalyst

The aqueous Ni—Mo—P-gluconic acid solution prepared in (2) was supported on the γ-alumina of (1) by an impregnation method. That is, 50 g of the γ-alumina was impregnated with 40 ml of the above aqueous impregnating solution. Then, the impregnated product was irradiated with a microwave having a frequency of 2.45 GHz for 10 minutes to be dried, whereby Catalyst c was prepared.

COMPARATIVE EXAMPLE 4

Commercially Available Catalyst:

A commercially available cobalt-molybdenum catalyst d supported on γ-alumina was employed, which had been used for desulfurization of gasoline fractions. The catalyst had been prepared by impregnating γ-alumina with a metal-containing aqueous solution and burning the product in an electric furnace after usual drying (air drying).

Analysis of Catalysts: The Limitation of Physical Properties in the Claims is also Defined by the Following Analytical Means:

Using Catalysts A to D prepared in Examples 1 to 4 and Catalysts a to d in Comparative Examples 1 to 4, the local structure of each molybdenum sulfide supported on the alumina support was analyzed by extended X-ray absorption fine structure (EXAFS) analysis. For the measurement of EXAFS, a transmission X-ray absorption spectrophotometric instrument using a 50% argon-50% nitrogen gas ionization chamber and an argon gas ionization chamber as an incident X-ray intensity detector and a transmission X-ray intensity detector, respectively was used in a hard X-ray beam line (BL10B) equipped with a silicon(311) channel-cut crystal spectroscopic instrument at Radiation Research facility of Institute of Material Structure Science in High Energy Accelerator Research Organization. The measurement was carried out on a molybdenum K absorption edge at 600 measuring points for an integration time of 2 to 6 seconds/measuring point in the range of 300 eV before the absorption edge to 1,500 eV after the absorption edge.

Each catalyst sample was pulverized into 100 to 200 mesh and then was packed into a reactor tube made of glass. Under a stream of a mixed gas of 5% hydrogen sulfide/95% hydrogen gas, the packed sample was sulfurated under heating from room temperature to a predetermined temperature of 360° C. at a temperature-elevating rate of 1° C./min and sulfurated at that temperature for further 3 hours (standard sulfuration). Thereafter, under a stream of a mixed gas of 5% hydrogen sulfide/95% hydrogen gas, the packed sample was cooled to 150° C., then further cooled after the stream was switched to 100% hydrogen gas, and cooled to room temperature after the stream was switched to 100% nitrogen gas at 50° C. The nitrogen-included reactor made of glass was transferred into a globe box substituted with nitrogen and a sulfurated powdery catalyst sample was press-molded using a tablet-molding equipment having a diameter of 10 mm. The molded sample was included in a polyethylene pack of 700 mm×1000 mm together with argon to be used as an EXAFS-measuring sample. The EXAFS sample preparation involving a series of the catalyst sulfuration processes and the disk-molding operation was performed on the day before EXAFS measurement.

The analysis was carried out by subtracting background absorption according to a smoothing method by cubic splain function to normalize an EXAFS vibrational component and then obtaining a radial distribution function around absorptive element (molybdenum) by Fourier transformation. Using $MoS_2$ edge crystal as a standard sample, the average coordination number of the sulfur atoms [N(S)] and the average coordination number of the molybdenum atoms [N(Mo)] around molybdenum were determined from the EXAFS radial distribution function of molybdenum on the alumina support of each catalyst, considering that the peak intensities of MO—S (0.242 nm) (triangular prism-type coordination) and Mo—Mo (0.316 nm) (in-plane hexagonal coordination) correspond to the number of sulfur atoms directly bonded to molybdenum and the number of closest molybdenum atoms around molybdenum, respectively. Since $MoS_2$ single crystal has N(Mo) of 6 and N(S) of 6, the closer to 6 the N(Mo) and N(S) are, the higher the degree of $MoS_2$ crystallinity is. Also, the higher the N(S) is, the higher the degree of sulfuration is. As shown in Table 1, it is revealed that Catalyst A which is Example of the present invention has a high degree of crystallinity of $MoS_2$ crystal and a high degree of sulfuration since the average coordination number of the molybdenum atoms [N(Mo)] is large and the average coordination number of the sulfur atoms [N(S)] is large as compared with Catalyst B of Comparative Example.

TABLE 1

| | Catalyst | Active metal | Drying conditions | Burning conditions | Sulfuration temperature | Coordination number determined by EXAFS N(Mo) | N(S) |
|---|---|---|---|---|---|---|---|
| Ex. 1 | A | CoMo | Microwave drying | None | 360° C. | 2.4 | 4.8 |
| Ex. 2 | B | CoMo | Microwave drying | None | 360° C. | 1.7 | 3.9 |
| Ex. 3 | C | CoMo | Microwave drying | 550° C. | 360° C. | 2.1 | 4.4 |
| Ex. 4 | D | CoMo | Microwave drying | None | 360° C. | 2.0 | 5.0 |

TABLE 1-continued

| | Catalyst | Active metal | Drying conditions | Burning conditions | Sulfuration temperature | Coordination number determined by EXAFS N(Mo) | N(S) |
|---|---|---|---|---|---|---|---|
| Comp. Ex. 1 | a | CoMo | Microwave drying | None | 360° C. | 2.6 | 5.2 |
| Comp. Ex. 2 | b | CoMo | Microwave drying | None | 360° C. | 1.3 | 3.4 |
| Comp. Ex. 3 | c | NiMo | Microwave drying | None | 360° C. | 3.4 | 5.3 |
| Comp. Ex. 4 | d | CoMo | Usual drying (air drying) | 550° C. | 360° C. | 1.4 | 3.6 |

Evaluation 1 of Catalyst:

Using Catalysts A to D prepared in Examples 1 to 4 and Catalysts a to d in Comparative Examples 1 to 4, the hydrodesulfurization activity and hydrogenation activity were evaluated on heavy catalytic cracking gasoline (residual fraction after a light fraction was removed at a distillation temperature of 60° C.) having properties shown in Table 2. After 250 mg of each catalyst was packed into a reactor tube, presulfuration was carried out at 360° C. for 3 hours under a stream of 5% hydrogen sulfide/95% hydrogen and then used in the reaction. With regard to Catalyst A obtained in Example 1, low-temperature sulfuration at 320° C. was carried out and the catalyst was subjected to the reaction and the influence of the sulfuration temperature on the catalytic activity was investigated. Namely, after 250 mg of the catalyst was packed into a reactor tube, presulfuration was carried out at 320° C. for 3 hours under a stream of 5% hydrogen sulfide/95% hydrogen (low-temperature sulfuration) and then used in the reaction. The reaction for evaluation of hydrodesulfurization was carried out under conditions of a reaction temperature of 240° C., a reaction pressure of 1.0 MPa, $LHSV^{-1}$ of 4 $h^{-1}$, and a ratio of hydrogen/oil of 100 NL (based on standard conditions converted to 0° C. and 1 atm)/L. For the quantitative determination of the sulfur concentration, a TS-100V instrument manufactured by Dia Instruments Co., Ltd. was used. Moreover, for the analysis and quantitative determination of paraffins, isoparaffins, naphthenes, and aromatics, a gas chromatograph (GPI system) manufactured by Yokogawa Analytical Systems was used. A desulfurization rate was calculated from the sulfur amount-reduction rate in the starting material, an olefin hydrogenation rate was calculated from the olefin-reduction rate in the starting material, and further an aromatic hydrogenation rate was calculated from aromatic-reduction rate in the starting material according to the following expressions.

TABLE 2

| Properties | Properties of heavy catalytic cracking gasoline |
|---|---|
| Density (g/cc at 15° C.) | 0.771 |
| Sulfur content (ppm by weight) | 234.1 |
| Paraffin content (% by volume) | 4.8 |
| Isoparaffin content (% by volume) | 32.4 |
| Olefin content (% by volume) | 19.7 |
| Naphthene content (% by volume) | 12.4 |
| Aromatic content (% by volume) | 30.8 |
| GC-RON | 88.9 |
| GC-MON | 78.2 |
| Distillation efflux volume (%) | Efflux temperature (° C.) |

TABLE 2-continued

| | |
|---|---|
| Initial boiling point (IBP) | 75.0 |
| 10 | 90.3 |
| 50 | 120.1 |
| 90 | 176.6 |
| 95 | 191.0 |
| Final boiling point (FBP) | 205.5 |

$$\text{Desulfurization rate (\%)}=[(S_f-S_p)/S_f]\times 100$$

$$\text{Olefin hydrogenation rate (\%)}=[(U_f-U_p)/U_f]\times 100$$

$$\text{Aromatic hydrogenation rate (\%)}=[(A_f\times A_p)/A_f]\times 100$$

wherein:

Sf: sulfur content in the starting material (% by weight),

Sp: sulfur content in the hydrotreated product oil (% by weight),

Uf: olefin content in the starting material (% by volume)

Up: olefin content in the hydrotreated product oil (% by volume),

Af: aromatic content in the starting material (% by volume), and

Ap: aromatic content in the hydrotreated product oil (% by volume)

The hydrodesulfurization activity and hydrogenation activity against the heavy catalytic cracking gasoline (residual fraction after a light fraction was removed at a distillation temperature of 60° C.) having properties shown in Table 2 using Catalysts A to D prepared in Examples 1 to 4 and Catalysts a to d in Comparative Examples 1 to 4 are shown in Table 3. As shown in Table 3, Catalysts A to D which are Examples of the present invention exhibit a high desulfurization performance of 90% or more. Moreover, since the hydrogenation activity is suppressed, the decrease of the octane number determined on the gas chromatography (GC-RON) is 1 or less and thus selective desulfurization has proceeded. From the comparison between Catalyst A and Catalyst C, it is revealed that the dried catalyst (Catalyst A) is superior to the burned catalyst (Catalyst C) in view of selective desulfurization since the desulfurization activity is high and the hydrogenation activity against olefins is suppressed in the former catalyst. In Catalysts a, c, and d of Comparative Examples, a desulfurization activity of 90% or more is achieved but, since the hydrogenation of olefins also proceeds simultaneously, the decrease of the octane number (GC-RON) is 1 or more and thus the decrease of the octane number (GC-RON) is large. In Catalyst b, the decrease of the octane number (GC-RON) is small but the desulfurization activity is also low. Moreover, from the influence of the catalyst sulfuration temperature on the performance of Catalyst A, it is revealed that a high desulfurization performance and the suppression of olefin hydrogenation can be simultaneously realized by controlling the sulfuration temperature of catalysts.

TABLE 3-1

| Catalyst | Ex. 1 A | | Ex. 2 B | Ex. 3 C | Ex. 4 D |
|---|---|---|---|---|---|
| Reaction temperature (° C.) | 240 | | 240 | 240 | 240 |
| Reaction pressure (MPa) | 1 | | 1 | 1 | 1 |
| LHSV ($h^{-1}$) | 4 | | 4 | 4 | 4 |
| $H_2$/oil ratio (NL/L) | 100 | | 100 | 100 | 100 |
| Sulfuration temperature (° C.) | 360 | 320 | 360 | 360 | 360 |
| Desulfurization rate (%) | 93.8 | 90.4 | 90.1 | 90.0 | 91.0 |
| Total olefin hydrogenation rate (%) | 19.9 | 13.9 | 17.2 | 21.3 | 23.0 |
| Aromatic hydrogenation rate (%) | 0 | 0 | 0 | 0.2 | 0 |
| GC-RON | 88 | 88.2 | 88.1 | 87.9 | 87.9 |
| ΔGC-RON | −0.9 | −0.7 | −0.8 | −1.0 | −1.0 |

TABLE 3-2

| Catalyst | Comp. Ex. 1 a | Comp. Ex. 2 b | Comp. Ex. 3 c | Comp. Ex. 4 d |
|---|---|---|---|---|
| Reaction temperature (° C.) | 240 | 240 | 240 | 240 |
| Reaction pressure (MPa) | 1 | 1 | 1 | 1 |
| LHSV ($h^{-1}$) | 4 | 4 | 4 | 4 |
| $H_2$/oil ratio (NL/L) | 100 | 100 | 100 | 100 |
| Sulfuration temperature (° C.) | 360 | 360 | 360 | 360 |
| Desulfurization rate (%) | 98.5 | 82.9 | 98.9 | 94.1 |
| Total olefin hydrogenation rate (%) | 23.5 | 12.1 | 65.1 | 24.8 |
| Aromatic hydrogenation rate (%) | 1.8 | 0 | 2.1 | 0 |
| GC-RON | 87.8 | 88.4 | 86.1 | 87.7 |
| ΔGC-RON | −1.2 | −0.5 | −2.8 | −1.3 |

Evaluation 2 of Catalyst:

Using Catalysts A to D prepared in Examples 1 to 4 and Catalysts a to d in Comparative Examples 1 to 4, the hydrodesulfurization activity and hydrogenation activity were evaluated on whole-fraction catalytic cracking gasoline having properties shown in Table 4. After 250 mg of each catalyst was packed into a reactor tube, presulfuration was carried out at 360° C. for 3 hours under a stream of 5% hydrogen sulfide/95% hydrogen (standard sulfuration) and then used in the reaction. With regard to Catalyst A obtained in Example 1, low-temperature sulfuration at 320° C. was carried out and the catalyst was subjected to the reaction and the influence of the sulfuration temperature on the catalytic activity was investigated. Namely, after 250 mg of the catalyst was packed into a reactor tube, presulfuration was carried out at 320° C. for 3 hours under a stream of 5% hydrogen sulfide/95% hydrogen (low-temperature sulfuration) and then used in the reaction. The reaction for evaluation of hydrodesulfurization was carried out under conditions of a reaction temperature of 220° C., 240° C., or 260° C., a reaction pressure of 1.0 MPa, $LHSV^{-1}$ of 4 $h^{-1}$, and a ratio of hydrogen/oil of 100 NL (based on standard conditions converted to 0° C. and 1 atm)/L. For the quantitative determination of the sulfur concentration, a TS-100V instrument manufactured by Dia Instruments Co., Ltd. was used. Moreover, for the analysis and quantitative determination of paraffins, isoparaffins, naphthenes, and aromatics, a gas chromatograph (GPI system) manufactured by Yokogawa Analytical Systems was used. A desulfurization rate was calculated from the sulfur amount-reduction rate in the starting material, an olefin hydrogenation rate was calculated from the olefin-reduction rate in the starting material, and further an aromatic hydrogenation rate was calculated from aromatic-reduction rate in the starting material according to the same expressions as in the case of the heavy catalytic cracking gasoline.

TABLE 4

| Properties | Properties of heavy catalytic cracking gasoline |
|---|---|
| Density (g/cc at 15° C.) | 0.733 |
| Sulfur content (ppm by weight) | 158.9 |
| Paraffin content (% by volume) | 5.5 |
| Isoparaffin content (% by volume) | 37.6 |
| Olefin content (% by volume) | 26.3 |
| Naphthene content (% by volume) | 9.2 |
| Aromatic content (% by volume) | 21.4 |
| GC-RON | 90.5 |
| GC-MON | 79.5 |
| Distillation efflux volume (%) | Efflux temperature (° C.) |
| Initial boiling point (IBP) | 36.8 |
| 10 | 54.5 |
| 50 | 97.0 |
| 90 | 165.9 |
| 95 | 181.5 |
| Final boiling point (FBP) | 197.0 |

The hydrodesulfurization activity and hydrogenation activity against the whole-fraction cracking gasoline having properties shown in Table 4 using Catalysts A to D prepared in Examples 1 to 4 and Catalysts a to d prepared in Comparative Examples 1 to 4 are shown in Table 5. In the hydrotreatment with Catalysts A to D, which are Examples, under conditions of a reaction temperature of 240° C., a high desulfurization performance of 90% or more is obtained. However, since the reactivity of the whole-fraction catalytic cracking gasoline increases as compared with the heavy catalytic cracking gasoline, the decrease of the octane number determined on the gas chromatography (GC-RON) exceeds 1. In Catalyst a and c of Comparative Examples, the desulfurization activity of 90% or more is achieved but the decrease of the octane number (GC-RON) is large. Catalyst b exhibits the decrease of the octane number (GC-RON) of 1 or less but desulfurization activity is low. From the comparison between Catalyst A and Catalyst d under conditions of a reaction temperature of 260° C., it is revealed that the decrease of the octane number (GC-RON) is lower in the case of Catalyst A. This fact indicates that superiority of Catalyst A shown in Example 1 further increases in the case that the elevation of the reaction temperature is unavoidable in order to obtain an extremely high desulfurization activity.

TABLE 5-1

| Catalyst | Ex. 1 A | | Ex. 2 B | Ex. 3 C | Ex. 4 D |
|---|---|---|---|---|---|
| Reaction temperature (° C.) | 240 | 260 | 240 | 240 | 240 |
| Reaction pressure (MPa) | 1 | | 1 | 1 | 1 |
| LHSV ($h^{-1}$) | 4 | | 4 | 4 | 4 |
| $H_2$/oil ratio (NL/L) | 100 | | 100 | 100 | 100 |
| Sulfuration temperature (° C.) | 320 | | 360 | 360 | 360 |
| Desulfurization rate (%) | 93.3 | 97.7 | 94.0 | 92.7 | 93.9 |
| Total olefin hydrogenation rate (%) | 19.7 | 25.6 | 20.5 | 25.7 | 26.9 |
| Aromatic hydrogenation rate (%) | 0 | 0 | 0 | 0 | 0 |
| GC-RON | 89.4 | 89.2 | 89.4 | 89.2 | 89.2 |
| ΔGC-RON | −1.1 | −1.3 | −1.1 | −1.3 | −1.3 |

TABLE 5-2

| Catalyst | Comp. Ex. 1 a | Comp. Ex. 2 b | Comp. Ex. 3 c | Comp. Ex. 4 d | |
|---|---|---|---|---|---|
| Reaction temperature (° C.) | 240 | 240 | 240 | 240 | 260 |
| Reaction pressure (MPa) | 1 | 1 | 1 | 1 | |
| LHSV ($h^{-1}$) | 4 | 4 | 4 | 4 | |
| $H_2$/oil ratio (NL/L) | 100 | 100 | 100 | 100 | |
| Sulfuration temperature (° C.) | 360 | 320 | 360 | 360 | |
| Desulfurization rate (%) | 99.2 | 83.8 | 99.0 | 94.3 | 99.2 |
| Total olefin hydrogenation rate (%) | 29.6 | 11.6 | 69.0 | 29.8 | 40.8 |
| Aromatic hydrogenation rate (%) | 1.0 | 0 | 1.6 | 0 | 0 |
| GC-RON | 89.0 | 89.8 | 87.4 | 89.0 | 88.6 |
| ΔGC-RON | −1.5 | −0.7 | −3.1 | −1.5 | −1.9 |

The hydrodesulfurization activity and hydrogenation activity against olefins in the case that the heavy catalytic cracking gasoline (residual fraction after a light fraction was removed at a distillation temperature of 60° C.) having properties shown in Table 2 is hydrotreated using Catalysts A to D prepared in Examples 1 to 4 and Catalysts a to d in Comparative Examples 1 to 4 as well as the average coordination number [N(Mo)] of the molybdenum atoms around the molybdenum atom and the average coordination number [N(S)] of the sulfur atoms around the molybdenum atom obtained from the EXAFS analysis of each catalyst are shown in Table 6.

TABLE 6-1

| | Catalyst | Sulfuration temperature | Coordination number determined by EXAFS N(Mo) | N(S) | | Olefin hydrogenation rate (%) |
|---|---|---|---|---|---|---|
| Ex. 1 | A | 360° C. | 2.4 | 4.8 | 93.8 | 19.9 |
| | | 320° C. | 1.9 | 4.5 | 90.4 | 13.9 |
| Ex. 2 | B | 360° C. | 1.7 | 3.9 | 90.1 | 17.2 |
| Ex. 3 | C | 360° C. | 2.1 | 4.4 | 90.0 | 21.3 |

TABLE 6-1-continued

| | Catalyst | Sulfuration temperature | Coordination number determined by EXAFS N(Mo) | N(S) | | Olefin hydrogenation rate (%) |
|---|---|---|---|---|---|---|
| Ex. 4 | D | 360° C. | 2.0 | 5.0 | 91.0 | 23.0 |
| Comp. Ex. 1 | a | 360° C. | 2.6 | 5.2 | 98.5 | 23.5 |
| Comp. Ex. 2 | b | 360° C. | 1.3 | 3.4 | 82.9 | 12.1 |
| Comp. Ex. 3 | c | 360° C. | 3.4 | 5.3 | 98.9 | 65.1 |
| Comp. Ex. 4 | d | 360° C. | 1.4 | 3.6 | 94.1 | 24.8 |

TABLE 6-2

| | Catalyst | Sulfuration temperature | Olefin hydrogenation rate (%)/ desulfurization rate (%) | ΔGC-RON |
|---|---|---|---|---|
| Ex. 1 | A | 360° C. | 0.21 | −0.9 |
| | | 320° C. | 0.15 | −0.7 |

TABLE 6-2-continued

| | Catalyst | Sulfuration temperature | Olefin hydrogenation rate (%)/ desulfurization rate (%) | ΔGC-RON |
|---|---|---|---|---|
| Ex. 2 | B | 360° C. | 0.19 | −0.8 |
| Ex. 3 | C | 360° C. | 0.24 | −1.0 |
| Ex. 4 | D | 360° C. | 0.25 | −1.0 |
| Comp. Ex. 1 | a | 360° C. | 0.24 | −1.2 |
| Comp. Ex. 2 | b | 360° C. | 0.15 | −0.5 |
| Comp. Ex. 3 | c | 360° C. | 0.66 | −2.8 |
| Comp. Ex. 4 | d | 360° C. | 0.26 | −1.3 |

Catalysts A to D obtained in Examples exhibit a high desulfurization activity and also a small hydrogenation activity against olefins, so that the decrease of the octane number (GC-RON) becomes 1 or less and hence selective desulfurization is achievable. In particular, in Catalyst A sulfated at the low-temperature of 320° C., the degree of crystal growth at (002) plane of $MoS_2$ crystal is small and the desulfurization activity decreases but a suppressive effect on olefin hydrogenation activity is large, so that it is apparent that the catalyst is excellent in selective desulfurization. In this case, the average coordination number [N(Mo)] of the molybdenum atoms around the molybdenum atom obtained from EXAFS analysis is from 1.5 to 2.5 and the average coordination number [N(S)] of the sulfur atoms around the molybdenum atom is from 3.5 to 5.0. In the cases of Catalysts a to d of Comparative Examples, since the olefin hydrogenation activity increases as the desulfurization increases, selective desulfurization is difficult to achieve. In this case, the average coordination number [N(Mo)] of the molybdenum atoms around the molybdenum atom obtained from EXAFS analysis is less than 1.5 or more than 2.5 and the average coordination number [N(S)] of the sulfur atoms around the molybdenum atom is less than 3.5 or more than 5.0.

The hydrodesulfurization activity and hydrogenation activity obtained in the case that the whole-fraction catalytic cracking gasoline having properties shown in Table 4 is hydrotreated (reaction temperature of 240° C.) using Catalysts A and B prepared in Examples 1 and 2 and Catalyst d prepared in Comparative Example 4 as well as the average coordination number [N(Mo)] of the molybdenum atoms around the molybdenum atom and the average coordination number [N(S)] of the sulfur atoms around the molybdenum atom obtained from the EXAFS analysis of each catalyst are shown in Table 7.

TABLE 7-1

| | Catalyst | Sulfuration temperature | Coordination number determined by EXAFS N(Mo) | N(S) | Desulfurization rate (%) | Olefin hydrogenation rate (%) |
|---|---|---|---|---|---|---|
| Ex. 1 | A | 320° C. | 1.9 | 4.5 | 93.3 | 19.7 |
| Ex. 2 | B | 360° C. | 1.6 | 3.9 | 94.0 | 20.5 |
| Comp. Ex. 4 | d | 360° C. | 1.4 | 3.6 | 94.3 | 29.8 |

TABLE 7-2

| | Catalyst | Sulfuration temperature | Olefin hydrogenation rate (%)/ desulfurization rate (%) | ΔGC-RON |
|---|---|---|---|---|
| Ex. 1 | A | 320° C. | 0.21 | −1.1 |
| Ex. 2 | B | 360° C. | 0.14 | −1.1 |
| Comp. Ex. 4 | d | 360° C. | 0.24 | −1.5 |

When the whole-fraction catalytic cracking gasoline is hydrotreated using Catalysts A and B obtained in Examples, the desulfurization activity is high and the olefin hydrogenation activity is also high, the decrease of the octane number (GC-RON) becomes large as compared with the case that the heavy catalytic cracking gasoline having properties shown in Table 2 is hydrotreated but the decrease rate is extremely small as compared with the decrease of the decrease of the octane number (GC-RON) observed in the case of Catalyst d of Comparative Example. When the catalysts shown in the present Example, since the decrease of the octane number (GC-RON) is around 1.1, it is possible to treat the whole-fraction catalytic cracking gasoline as it is without requiring complex operations that the starting oil is separated into a light content and a heavy content and only the heavy content is hydrotreated in order to suppress the decrease of the octane number (GC-RON).

FIG. 1 shows the relationship between the average coordination number [N(Mo)] of the molybdenum atoms around the molybdenum atom and the average coordination number [N(S)] of the sulfur atoms around the molybdenum atom obtained from the EXAFS analyses of the catalysts of Examples and Comparative Examples determined under the above measuring conditions. In this connection, Catalyst A obtained in Example 1 exhibits excellent performance that the desulfurization activity is improved and olefin hydrogenation activity decreases in the case of sulfuration at a low temperature (320° C.) as compared with the case of standard sulfuration (360° C.), and thus the average coordination number [N(Mo)] of the molybdenum atoms around the molybdenum atom and the average coordination number [N(S)] of the sulfur atoms around the molybdenum atom obtained after the sulfuration at a low temperature (320° C.) are also shown as A* (*: sulfuration at low temperature). The area in the frame is an area where selective desulfurization activity, i.e., desulfurization rate of the heavy catalytic cracking gasoline of 90% or more and the decrease of the octane number of 1 or less, is achieved.

While the invention has been described in detail and with reference to specific embodiments thereof, it will be apparent to one skill in the art that various changes and modifications can be made therein without departing from the spirit and scope thereof. All references cited herein are incorporated in their entirety.

This application is based on Japanese patent application No. 2004-149687 filed on May 19, 2004, the entire contents of which are incorporated hereinto by reference.

What is claimed is:

1. A hydrotreating catalyst comprising molybdenum (Mo), a phosphorus compound, sulfur and at least one metal selected from the group consisting of iron, cobalt and nickel, wherein the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when $MoS_2$ structure in the catalyst is measured in accordance with extended X-ray absorption fine structure (EXAFS) analysis, and wherein the molybdenum is contained in an amount of 6 to 15% by weight in terms of oxide, based on the weight of the catalyst.

2. The hydrotreating catalyst according to claim 1, wherein the at least one metal selected from the group consisting of iron, cobalt and nickel is contained in an amount of 0.5 to 8% by weight in terms of oxide, based on the weight of the catalyst.

3. The hydrotreating catalyst according to claim 1, wherein the phosphorus compound is selected from the group consisting of ammonium dihydrogen phosphate, diammonium hydrogen phosphate, trimetaphosphoric acid, pyrophosphoric acid, and tripolyphosphoric acid.

4. The hydrotreating catalyst according to claim 1, wherein the phosphorus compound is contained in an amount of 0.5 to 10% by weight in terms of metal, based on the catalyst.

5. The hydrotreating catalyst according to claim 1, which is produced by impregnating a support with an impregnating solution comprising a molybdenum compound, a phosphorus compound, a saccharide compound and at least one metal selected from the group consisting of iron, cobalt and nickel, followed by drying under irradiation with a microwave.

6. The hydrotreating catalyst according to claim 5, wherein the saccharide compound is at least one selected from aldonic acids, saccharic acids and uronic acids.

7. The hydrotreating catalyst according to claim 6, wherein the aldonic acid is gluconic acid.

8. A process for producing the hydrotreating catalyst according to claim 1, which comprises impregnating a support with an impregnating solution comprising a molybdenum compound, a phosphorus compound, a saccharide compound and at least one metal selected from the group consisting of iron, cobalt and nickel, followed by drying under irradiation with a microwave.

9. The process according to claim 8, wherein the saccharide compound is at least one selected from aldonic acids, saccharic acids and uronic acids.

10. The process according to claim 9, wherein the aldonic acid is gluconic acid.

* * * * *